United States Patent [19]
Etoh

[11] Patent Number: 5,729,289
[45] Date of Patent: Mar. 17, 1998

[54] IMAGE PICK-UP DEVICE AND DETACHABLE DISPLAY DEVICE EACH INCLUDING MEANS FOR CONTROLLING A PREDETERMINED FUNCTION

[75] Inventor: Kazuhiko Etoh, Tokyo, Japan

[73] Assignee: Canon Kabushiki Kaisha, Tokyo, Japan

[21] Appl. No.: 553,922

[22] Filed: Nov. 6, 1995

[30] Foreign Application Priority Data

Nov. 8, 1994 [JP] Japan ................................ 6-298993

[51] Int. Cl.$^6$ .................. H04N 5/222; H04N 5/225
[52] U.S. Cl. .............. 348/333; 348/373; 348/375; 348/376; 358/906; 379/428; 396/374
[58] Field of Search ................. 345/173; 348/207, 348/335, 340, 341, 372, 373, 374, 375, 376, 333; 358/906, 909.1; 396/373, 374, 535; 379/428, 433; 455/90, 351, 566, 575

[56] References Cited

U.S. PATENT DOCUMENTS

| | | | |
|---|---|---|---|
| 4,827,347 | 5/1989 | Bell | 358/224 |
| 4,837,817 | 6/1989 | Maemori | 358/224 |
| 5,130,813 | 7/1992 | Oie et al. | 358/335 |
| 5,396,287 | 3/1995 | Cho | 348/211 |
| 5,486,852 | 1/1996 | Arai | 348/211 |

Primary Examiner—Andrew Faile
Assistant Examiner—Ngoc-Yen Vu
Attorney, Agent, or Firm—Fitzpatrick, Cella, Harper & Scinto

[57] ABSTRACT

To provide an image pick-up device which provides high operability and high portability even when a large screen size monitor is mounted thereon, an electronic camera comprises an image pick-up device unit, a display device unit, a recording medium and a power supply. Holes for engaging with a locking pawl of the display device unit are formed in a cover of the image pick-up device unit. An LCD display device is arranged in front of a cover of the display device unit, the LCD display device functions as a view finder, a monitor and a display, and a touch panel is arranged in front of the LCD display device with a relative position being kept therebetween. When the display device unit is mounted on the image pick-up unit, manipulation keys corresponding to manipulation buttons of the image pick-up unit are displayed. The image pick-up device unit controls the switching of the image pick-up device unit based on an output signal from the touch panel. In this manner, the manipulation of the manipulation members which become difficult to manipulate or impossible to manipulate when the display device unit is mounted is conducted on the display device unit.

6 Claims, 8 Drawing Sheets

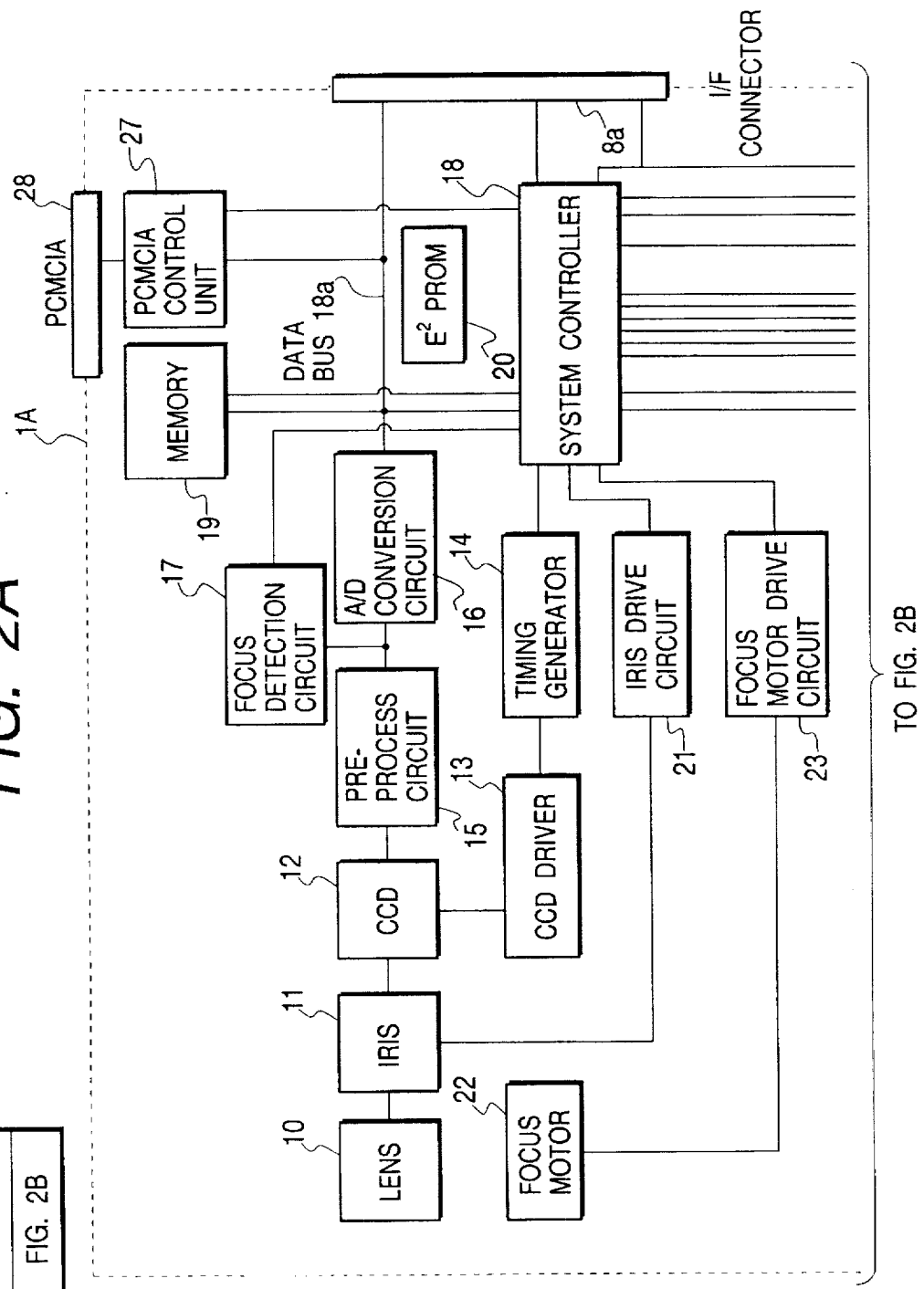

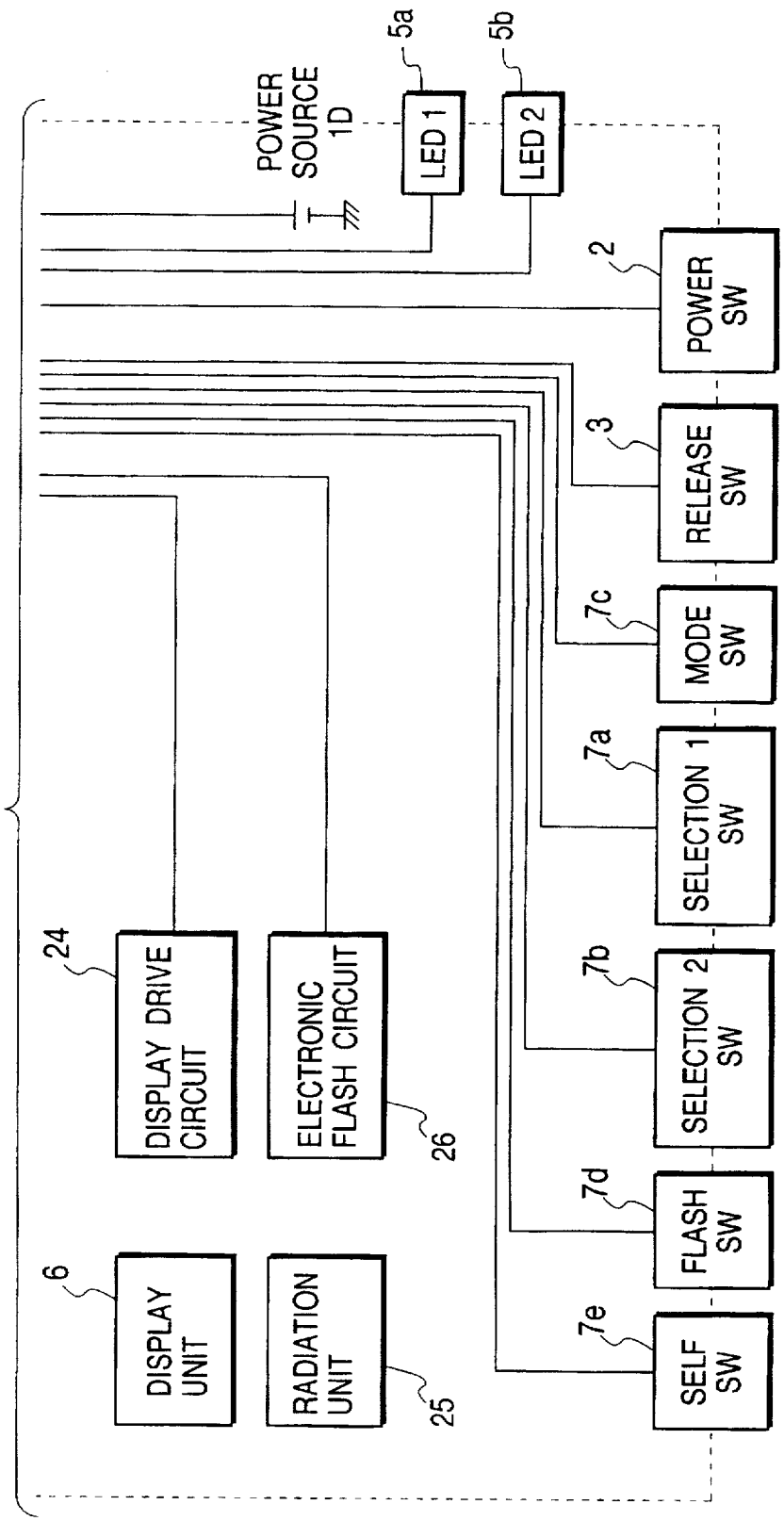

IMAGE PICK-UP DEVICE AND DETACHABLE DISPLAY DEVICE EACH INCLUDING MEANS FOR CONTROLLING A PREDETERMINED FUNCTION

BACKGROUND OF THE INVENTION

1. Field of the Invention

The present invention relates to an image pick-up device having a display device mounted on a body of image pick-up means for reproducing a video output and various displays and display means for an input operation.

2. Related Background Art

The recent advancement of video equipment such as electronic still cameras and video cameras is remarkable, and multi-function as well as miniaturization have been attempted and portability has been highly improved so that various types of image pick-up devices are marketed.

Since a display such as a liquid crystal display (LCD) has been made miniature and fine and a cost thereof has reduced, the display is combined with an image pick-up device for use as a view finder to display and monitor a picked-up image or as a monitor to reproduce a recorded image.

The products which combine the display with the image pick-up device include a type in which a user attaches and detaches a display as required and an integrated type.

Further, as an electronic notebook has become multi-functional, a key entry operation or character entry are permitted on a screen by a combination of a touch panel and a LCD monitor.

However, in the prior art, the following problems are encountered in increasing the screen size of the monitor.

Namely, since the image pick-up device is compact, layout and size of manipulation members of the image pick-up device are restricted when a large screen size monitor is to be attached. When it is constructed to reduce an overlapping area of the image pick-up device and the attached monitor in order to prevent interference with the manipulation members, the monitor extends beyond the image pick-up device and a projection area when the monitor is attached increases and the portability is deteriorated.

SUMMARY OF THE INVENTION

It is a first object of the present invention to provide an image pick-up device which provides high operability and high portability even when a display device having a large screen size monitor is attached.

It is a second object of the present invention to provide an image pick-up device which eliminates restriction of layout and size of the manipulation members of the image pick-up device or restrictions of a mounting position of the display device on the image pick-up device.

It is a third object of the present invention to provide an image pick-up device which is easy to watch and highly operable.

It is a fourth object of the present invention to provide an image pick-up device which eliminates a troublesome switching operation.

In accordance with one aspect of the present invention, the image pick-up device comprises image pick-up means having a manipulation member, display means removably mounted on a body of the image pick-up means for reproducing a video output from the image pick-up means, and manipulation switching means for switching an operation by the manipulation member of the image pick-up means to an entry operation on the display means upon mounting said display means on said image pick-up means.

In accordance with another aspect of the present invention, the manipulation switching means switches the operation by the manipulation member of the image pick-up means which becomes difficult to manipulate or impossible to manipulate when the display means is mounted on the image pick-up means to the entry operation on the display means.

In accordance with another aspect of the present invention, the display means includes enlargement display means for enlargedly displaying the display corresponding to the manipulation key.

In accordance with other aspect of the present invention, the display means includes detection means for detecting the mounting of the display means on the body of the image pick-up means, and the manipulation switching means switches the operation by the manipulation member of the image pick-up means to the entry operation on the display means when the mounting is detected.

In accordance with another aspect of the present invention, the display means includes a power switch, and the manipulation switching means switches the operation by the manipulation member of the image pick-up means to the entry operation on the display means when the power switch is turned on.

In accordance with another aspect of the present invention, the display device is removably mounted on a body of an image pick-up device having a manipulation member and including a display reproducing a video output from the image pick-up device and comprises a touch panel disposed on the display for performing an entry operation by a manipulation key displayed on the display. An operation by the manipulation member of the image pick-up device is switched to the entry operation of the touch panel by the mounting of the display device on the image pick-up device. The above and other objects and features of the present invention will become apparent from the following detailed description and the appended claims with reference to the accompanying drawings.

BRIEF DESCRIPTION OF THE DRAWINGS

FIG. 2 is comprised of FIGS. 2A and 2B showing block diagrams of an electrical circuit of an image pick-up device unit 1A of the electronic camera.

DETAILED DESCRIPTION OF THE PREFERRED EMBODIMENTS

An embodiment of the image pick-up device of the present invention is now explained. The image pick-up device of the present invention is applied to an electronic camera.

Figure 1:
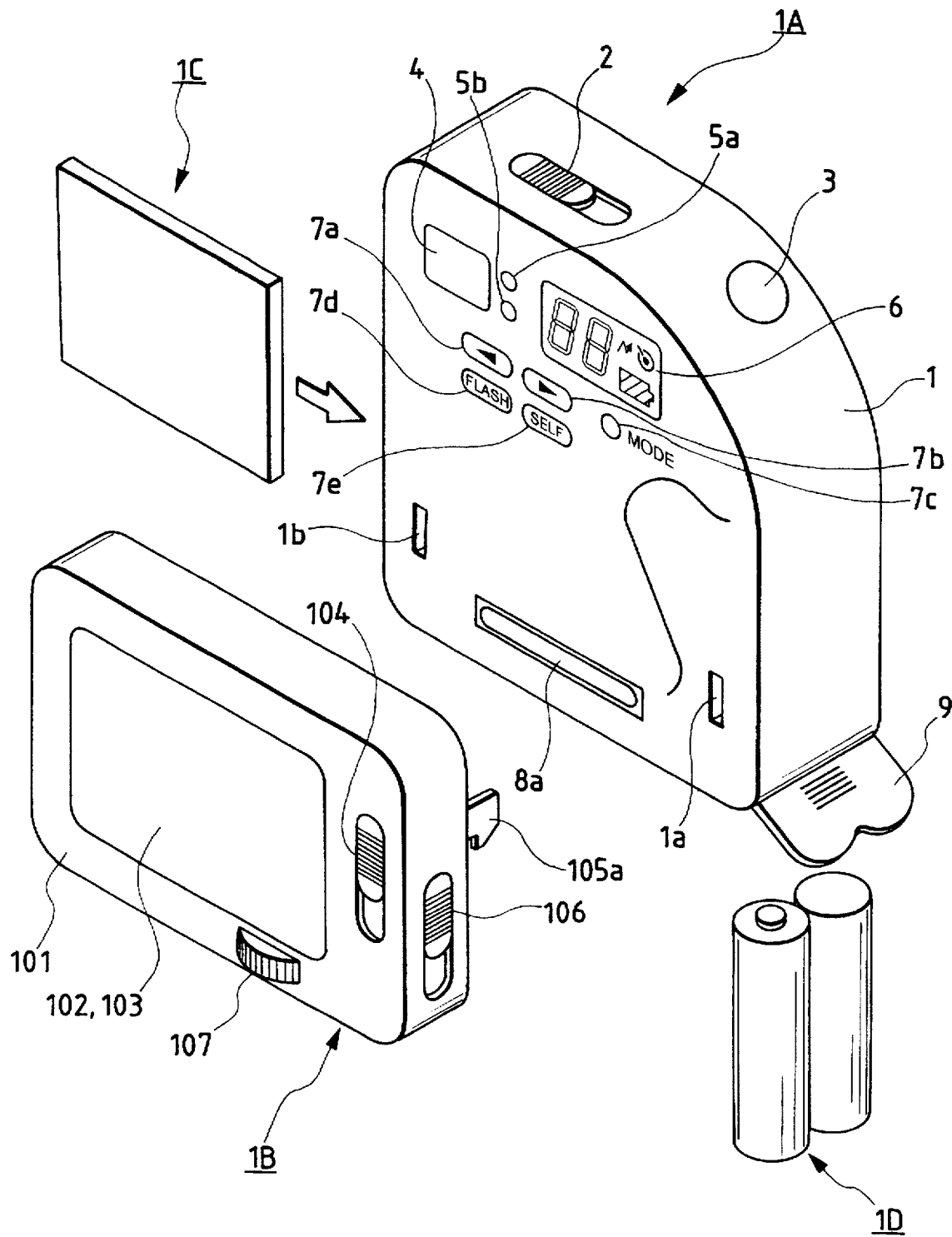
FIG. 1 shows a perspective view of a construction of an electronic camera in one embodiment.

FIG. 1 shows a perspective view of a construction of the electronic camera of the present embodiment. In FIG. 1, numeral 1A denotes an image pick-up device unit, numeral 1B denotes a display device unit, numeral 1C denotes a recording medium and numeral 1D denotes a power supply.

Numeral 1 denotes a cover which has holes 1a and 1b to engage with lock pawls of the display device unit 1B. Numeral 2 denotes a power supply switch and numeral 3 denotes a release button. The release button 3 is a two-stroke switch, and in a first stroke, a switch 1 is turned on to conduct pre-photographing operations such as photometering and range finding and in a second stroke, a switch 2 is turned on and the photographing operation is conducted.

Figure 4:
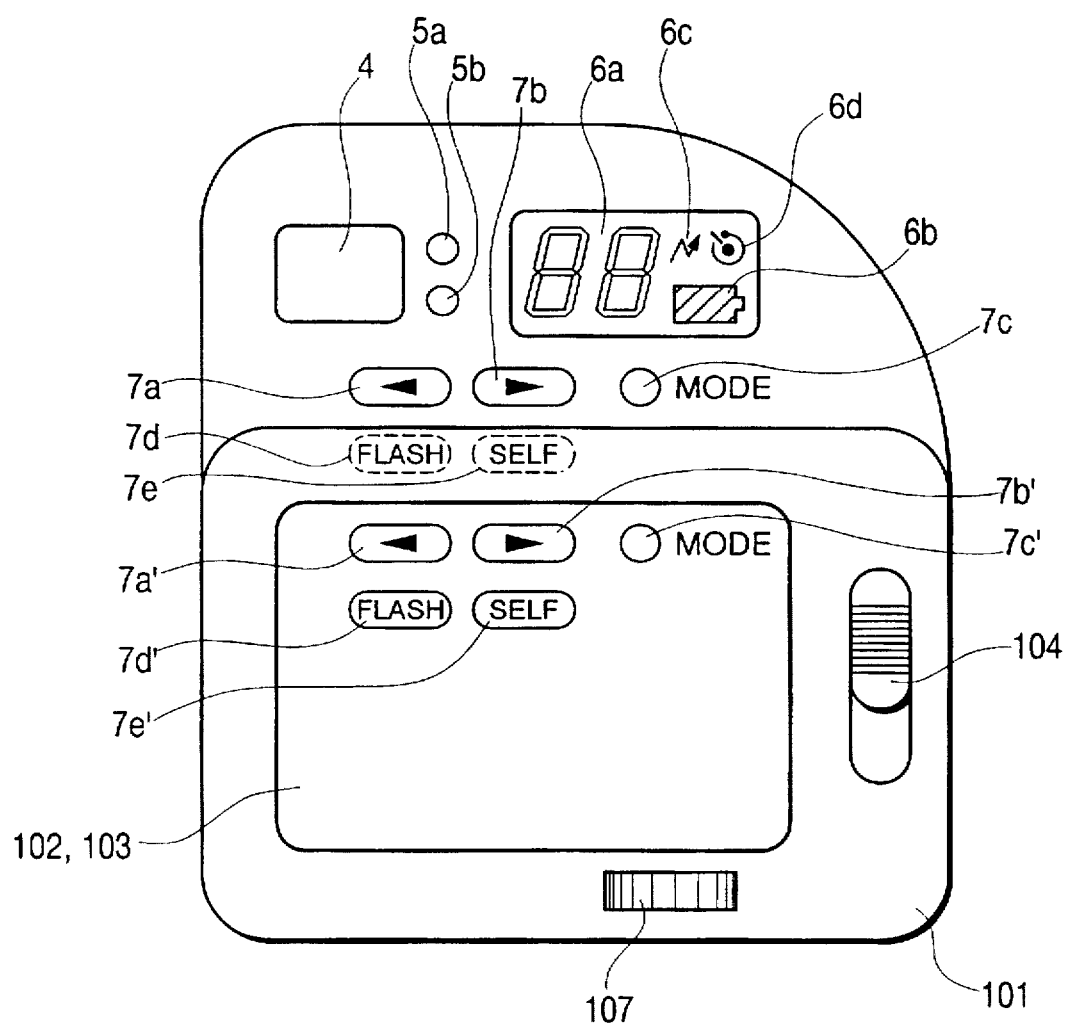
FIG. 4 shows a front external view of the electronic camera.

Numeral 4 denotes a finder and LED's 5a and 5b are arranged on a side thereof to indicate the completion of charging of a stroboscope and various warnings. A user can monitor the fire even if he is looking into the finder 4 or moves his eye away from the finder 4. FIGS. 1 and 4 show a front view of the electronic camera. Numeral 6 denotes a display LCD which comprises, as shown in FIG. 4, 2-digit, 7-segments 6a display, a battery remaining charge indicator 6b, a stroboscope flashing switch indicator 6c and a self-timer photographing indicator 6d.

Numerals 7a–7e denote buttons. The functions of the buttons will be described later. Numeral 8a denotes an interface (I/F) connector for connecting the image pick-up device unit 1A and the display device unit 1B. An I/F connector 8b, not shown, is mounted on the display device unit 1B at a corresponding position. Numeral 9 denotes a battery cover.

The display device unit 1B which is pluggable to the image pick-up device unit 1A is now explained. The display device unit 1B is used to monitor an image picked up by the image pick-up device unit 1A, reproduce a recorded image, display manipulation keys for various operations of the image pick-up device and for an entry operation.

Numeral 101 denotes a cover and numeral 102 denotes an LCD display device which functions as a view finder to display an image being picked up, a monitor to display a reproduced image of the recorded image and a display to display manipulation keys of the image pick-up device.

A known touch panel 103 is arranged to keep a relative position to the LCD display device in front of the LCD display device 102. Numeral 104 denotes a power switch. Numeral 105a denotes a lock pawl for locking the display device unit 1B to the image pick-up device unit 1A. It engages with holes 1a and 1b formed at positions facing the image pick-up device unit 1A to lock the cover 1 of the image pick-up device unit 1A and the cover 101 of the display device unit 1B in a substantially contacted position. Numeral 106 denotes a release lever which releases the display device unit 1B from the image pick-up device unit 1A and is linked to the locking pawls 105a and 105b.

The recording medium 1C comprises a memory card and it is inserted into a slot of the image pick-up device unit 1A and an image, associated information and sound are recorded thereon. The power supply 1D may be a secondary cell such as NiCd, a dry cell or a DC power supply, and it supplies power to the display device unit 1B, too, through the I/F connectors 8a and 8b.

Figure 3:
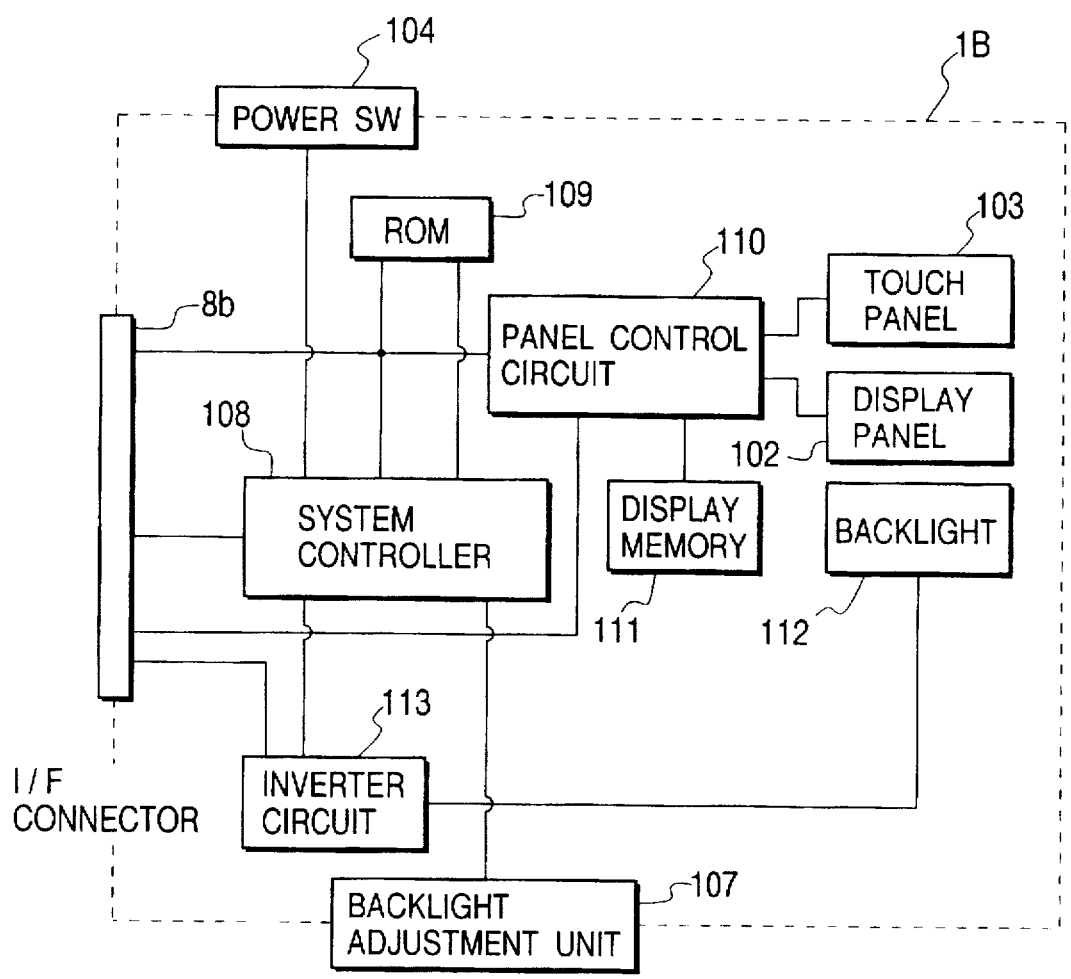
FIG. 3 shows a block diagram of an electrical circuit of a display device unit 1B of the electronic camera.

FIGS. 2A, 2B and 3 show block diagrams of an electrical configuration of the electronic camera. Numeral 10 denotes a lens, numeral 11 denotes an iris to adjust an incident light intensity, numeral 12 denotes an image sensor such as a CCD, numeral 13 denotes a CCD driver to drive the CCD and numeral 14 denotes a timing generator.

The image sensor 12 is driven by a timing signal generated by the timing generator through the CCD driver 13. Numeral 15 denotes a pre-processing circuit for applying a predetermined process to an image signal outputted from the image sensor 12, numeral 16 denotes an analog-digital converter (A/D converter), and numeral 17 denotes a focus detection circuit for extracting a high frequency focus evaluation signal which varies with an in-focus state from an image signal outputted from the pre-processing circuit 15 to detect a focus state.

Numeral 18 denotes a system controller for controlling an overall camera system and numeral 19 denotes a memory as a video memory for storing a picked-up video signal. The video signal converted to the digital signal by the A/D converter 16 is stored in the memory 19 which is controlled by a system controller 18. The output of the focus detection circuit 17 is inputted to the system controller 18 and a direction, velocity and distance of movement of drive of a focusing lens are calculated in accordance with the focus state.

Numeral 20 denotes an EEPROM which is connected to the system controller 18 to maintain necessary data. Numeral 21 denotes an iris drive circuit for controlling the iris 11 in accordance with a command from the system controller 18, numeral 22 denotes a focusing motor and numeral 23 denotes a focusing drive circuit for driving the focusing motor 22 based on a command from the system controller 18. Numeral 24 denotes a display drive circuit. Numeral 6 denotes a display unit which is controlled by the system controller 18 through the display drive circuit to indicate a memory remaining capacity and a battery remaining charge.

Numeral 2 denotes the power switch. Numeral 3 denotes the release switch which has the first stroke (SW1) and the second stroke (SW2) as described above. Upon detection of the turn-on of the SW1, the pre-photographing operation such as the detection of an exposure condition and range finding is started, and upon detection of the turn-on of the SW2, the photographing operation is conducted.

Numerals 5a and 5b denote light emitting diodes which are connected to the system controller 18 to indicate the completion of charging of the stroboscope, the completion of the focusing and warning of low brilliance. Numerals 7a and 7b denote select switches for selecting a recorded image for reproduction or erasure, numeral 7c denotes a mode switch for switching the recording, reproducing and erasing of the image pick-up device unit 1A, numeral 7d denotes a stroboscope switch for switching the stroboscope flashing, and numeral 7e denotes a self-timer switch for switching the normal photographing mode and the self-timer photographing mode. All those switches are connected to the system controller 18.

Numeral 8a denotes the interface connector for making an electrical connection with the display device unit 1B and numeral 18a denotes a data bus which is shared by a data line of the video signal between the A/D converter 16 and the memory 19 and a data line between a PCMCIA control means 27 to be described later and the system controller 18 and connected to the I/F connector 8a.

Numeral 28 denotes a PCMCIA connector used for an IC memory card and inputs and outputs video data or program data with a memory card connected to the PCMCIA connector 28 through the data bus 18a and the PCMCIA control means 27.

A system configuration of the display device unit 1B is now explained. Numeral 8b denotes an interface connector, numeral 108 denotes a system controller and numeral 109 denotes a ROM. The system controller 108 makes serial communication directly with the serial controller 18 of the image pick-up device unit 1A through the I/F connector 8b, and loads program data from the ROM 109 as appropriate to execute a predetermined operation. Numeral 110 denotes a panel control circuit, numeral 111 denotes a display memory, numeral 102 denotes an LCD display device as a display panel, and numeral 103 denotes a touch panel. The panel control circuit 110 displays the content of the display memory 111 on the LCD display device 102 in accordance with an operation mode set by the system controller 108.

The panel control circuit 110 controls the scan of the touch panel 103 and the output signal of the touch panel 103 is inputted to the system controller 108. The touch panel 103 is arranged in front of the LCD display device 102 to enter an operation by a light pen or a finger touch. The detection method therefor may use a transparent electrode or light emitting diodes and photo-transistors, all of which are known in the art and not described here.

Numeral 112 denotes a back light using a cold cathode tube, and numeral 113 denotes an inverter circuit for the back light 112. Numeral 107 denotes back light adjusting means for adjusting the brightness of the back light 112. When no entry operation is applied to the touch panel 103 for a predetermined time period, the back light 112 is shut down to save power consumption.

Figure 5:
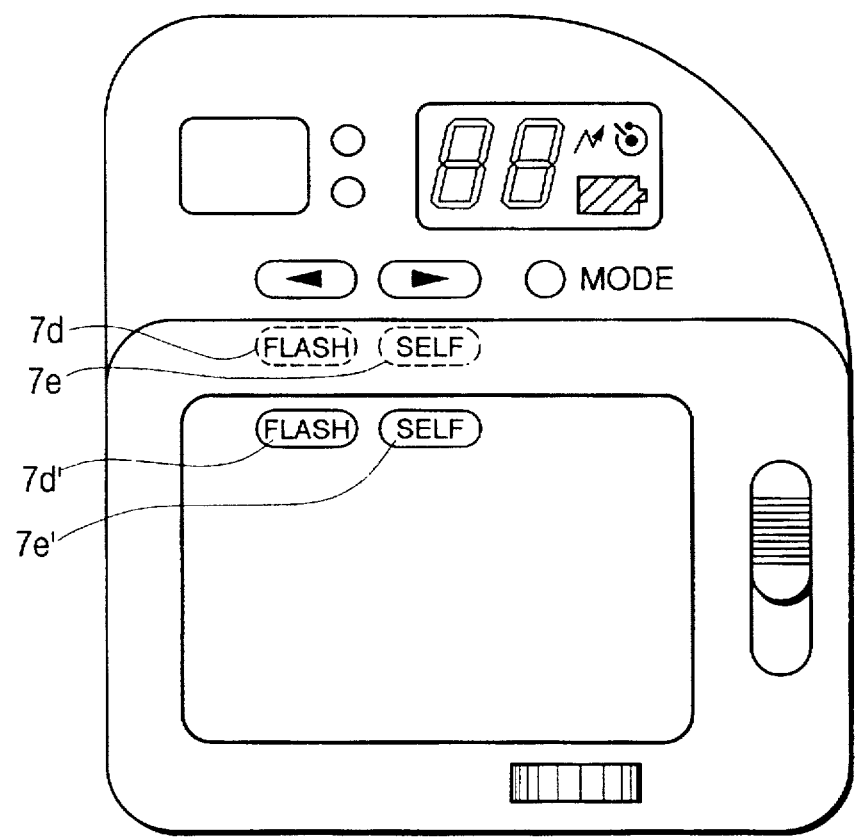
FIG. 5 shows a front external view of a modified electronic camera.
Figure 6:
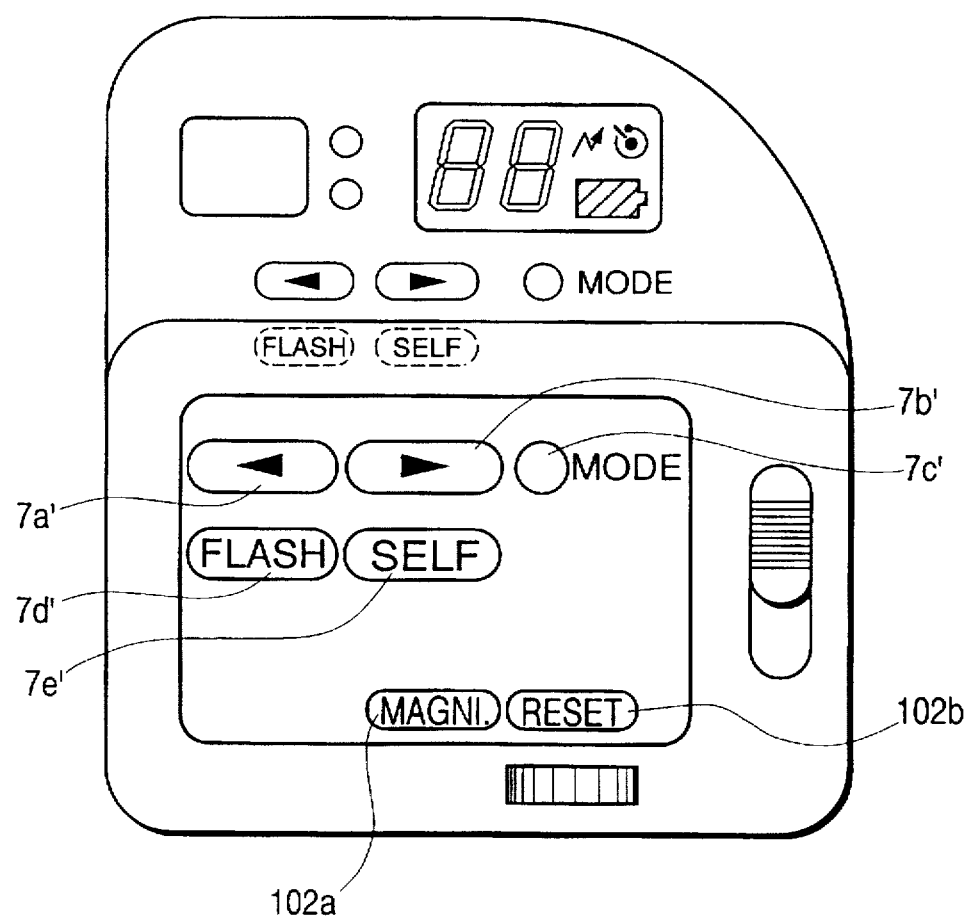
FIG. 6 shows a front external view of a modified electronic camera.

Referring to FIGS. 4 to 6, an operation of a console unit is explained. In FIG. 4, numerals 7a–7e denote manipulation buttons for various operations of the image pick-up device unit 1A. They are arranged on the back of the image pick-up device unit 1A.

When the display device unit 1B is not mounted, the image for reproduction or erasure of the recorded image is selected by the select switches 7a and 7b. A signal is supplied to the system controller 18 such that the forward feed is conducted for each depression of the select switch 7a and the backward feed is conducted for each depression of the switch 7b.

The switching of the recording, reproduction and erasure is conducted by the mode switch 7c and a signal is supplied to the system controller 18 such that the record mode which is set upon turn-on of the power switch 2 is switched to record→reproduce→erase→record for each depression of the mode switch 7c. The stroboscope switch 7d switches the flashing of the stroboscope and a signal is supplied to the system controller 18 such that the flashing and non-flashing are switched for each depression of the switch 7d. In the stroboscope flashing mode, the system controller 18 displays the stroboscope flashing switch indicator 6c of the display unit 6 through the display drive means 24, and in the non-flashing mode, it does not display.

The self-timer switch 7e switches between the normal photographing and the self-timer photographing. A signal is supplied to the system controller such that the normal photographing mode and the self-timer photographing mode are switched for each depression of the switch 7e. In the self-timer photographing mode, the system controller 18 displays the self-timer photographing indicator 6d of the display unit 6 through the display drive circuit 24 and in the normal photographing mode, it does not display.

When the display device unit 1B is mounted on the image pick-up device unit 1A, manipulation keys 7a'–7e' corresponding to the manipulation buttons 7a–7e of the image pick-up device unit 1A are displayed on the LCD display device as the display panel. In the present embodiment, the manipulation keys 7a–7e' are arranged in substantially the same layout as that of the manipulation buttons 7a–7e to facilitate the operation by the user.

The system controller 18 of the image pick-up device unit 1A controls the switching of the image pick-up device unit 1A based on the output signal from the touch panel 103 through the system controller 108 of the display device unit 1B and the panel control circuit 110. When a video image is displayed on the LCD display device 102, the manipulation keys 7a'–7e' are displayed in overlap with the video image.

FIG. 5 shows a front external view of a modified electronic camera. In FIG. 5, only those manipulation buttons which are difficult to manipulate or cannot be manipulated when the display device unit 1B is mounted on the image pick-up device unit 1A are switched on the display device unit 1B. Namely, since the manipulation buttons 7d and 7e overlap and are inoperable when the display device unit 1B is mounted, the manipulation keys 7d' and 7e' corresponding to the manipulation buttons 7d and 7e can be manipulated for an entry operation through the touch panel 103 displayed on the LCD display device 102.

FIG. 6 shows a front external view of a modified electronic camera. A display enlargement key 102a and a display return input key 102b are displayed on the LCD display device 102. When an entry from the display enlargement key 102a is sensed by the touch panel 103, the manipulation keys 7a'–7e' are displayed enlargedly, and when an entry from the display return input key 102b is sensed, by the touch panel 103 the display is returned to the original size.

Multi-size display enlargement may be conducted by enlarging the display in multiple steps and the sense area of the touch panel 103 may be enlarged in accordance with the change of the display size.

Figure 7:
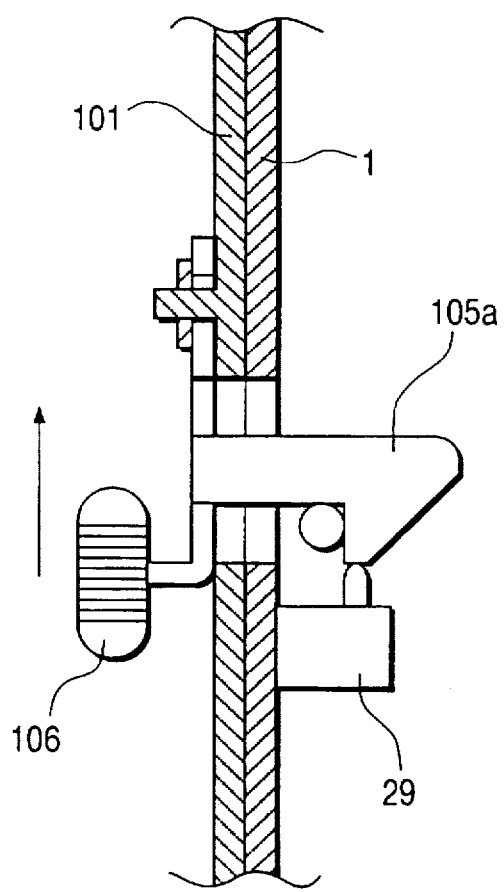
FIG. 7 shows a sectional view of a construction of a mount portion of the image pick-up device unit 1A and the display device unit 1B.

FIG. 7 shows a sectional view of a construction of the mount portion of the image pick-up device unit 1A and the display device unit 1B. In the present embodiment, when the connection of the I/F connectors 8a and 8b is detected and the turn-on of the mount detection switch 29 is detected by the mount of the locking pawl 105a of the display device unit 1B to the image pick-up device unit 1A, the switching is conducted on the display device unit 1B as described above.

When the power switch 104 of the display device unit 1B is turned on, the switching is conducted on the display device unit 1B.

In the above embodiments, the console unit is displayed on the display means and the selection is made by the touch panel. Alternatively, the console unit on the display means may be selected by a cursor or an arrow. In this case, the movement of the cursor or the arrow may be conducted by a button, a mouse, a track ball or a joy stick.

In accordance with the embodiment of the present invention, the image pick-up device comprises image pick-up means having a manipulation member, display means removably mounted on a body of the image pick-up means for reproducing a video output from the image pick-up means and manipulation switching means for switching an operation by the manipulation member of the image pick-up means to an entry operation on said display means upon mounting the display means on said image pick-up means.

Thus, the display means of a large screen size may be mounted on the compact image pick-up means without deteriorating the operability, restricting the layout of the manipulation members and deteriorating the portability.

In accordance with another embodiment, the manipulation switching means switches the operation by the manipulation member of said image pick-up means which becomes difficult to manipulate or impossible to manipulate when the display means is mounted on the image pick-up means to the entry operation on the display means.

Thus, the manipulation range to switch from the operation by the manipulation member of the image pick-up means to the entry operation on the display means can be minimized, the operation is easy to understand for the user and the operability is improved.

In accordance with other embodiment, the display means includes enlargement display means for enlargedly displaying the display corresponding to the manipulation key.

Thus, the entry operation may be readily conducted even in an unstable attitude and the device is easy to use even for a presbyopic person or weak sighted person.

In accordance with another embodiment, the display means includes detection means for detecting the mounting of the display means on the body of the image pick-up means, and the manipulation switching means switches the operation by the manipulation member of the image pick-up means to the entry operation on the display means when the mounting is detected.

Thus, no special switching operation is needed and the switching is simplified.

In accordance with another embodiment, the display means includes a power switch, and the manipulation switching means switches the operation by the manipulation member of the image pick-up means to the entry operation on the display means when the power switch is turned on.

Thus, no special switching operation is needed and the switching is simplified.

In accordance with another embodiment, the display device removably mounted on a body of an image pick-up device having a manipulation member and including a display reproducing a video output from the image pick-up device comprises a touch panel disposed on the display for performing an entry operation by a manipulation key displayed on the display. An operation by the manipulation member of the image pick-up device being switched to the entry operation of the touch panel by the mounting of the display device on the image pick-up device.

Thus, the display means of a large screen size may be mounted on the compact image pick-up means without deteriorating the operability, restricting the layout of the manipulation members and deteriorating the portability.

What is claimed is:

1. An image pick-up device comprising:
    image pick-up means having a manipulation member that generates an input signal for controlling a predetermined function of said image pick-up means;
    display means removably mountable on a body of said image pick-up means for reproducing a video output from said image pick-up means, for displaying a predetermined image corresponding to the predetermined function, and for generating an input signal for controlling the predetermined function; and
    manipulation switching means for switching between the input signal received from the manipulation member of said image pick-up means and the input signal received from said display means upon mounting said display means on said image pick-up means, wherein said manipulation switching means switches from the input signal received from the manipulation member of said image pick-up means to the input signal received from said display means when operation of the manipulation member becomes difficult to manipulate or impossible to manipulate when said display means is mounted on said image pick-up means.

2. An image pick-up device according to claim 1, wherein said display means includes enlargement display means for displaying an enlarged display in accordance with the input signal from the manipulation member.

3. An image pick-up device comprising:
    image pick-up means having a manipulation member that generates an input signal for controlling a predetermined function of said image pick-up means;
    display means removably mountable on a body of said image pick-up means for reproducing a video output from said image pick-up means, for displaying a predetermined image corresponding to the predetermined function, and for generating an input signal for controlling the predetermined function;
    said display means including detection means for detecting the mounting of said display means on the body of said image pick-up means; and
    manipulation switching means for switching between the input signal received from the manipulation member of said image pick-up means and the input signal received from said display means upon mounting said display means on said image pick-up means, said manipulation switching means switching from the input signal received from the manipulation member of said image pick-up means to the input signal received from said display means when the mounting is detected.

4. An image pick-up device according to claim 1, wherein said manipulation switching means switches from the input signal received from the manipulation member of said image pick-up means to the input signal received from said display means when operation of the manipulation member becomes difficult to manipulate or impossible to manipulate when said display means is mounted on said image pick-up means.

5. An image pick-up device according to claim 3, wherein said display means includes enlargement display means for displaying an enlarged display in accordance with the input signal from the manipulation member.

6. An image pick-up device according to claim 1, wherein said display means includes a power switch, and said manipulation switching means switches from the input signal received from the manipulation member of said image pick-up means to the input signal received from said display means when said power switch is turned on.

* * * * *

UNITED STATES PATENT AND TRADEMARK OFFICE
CERTIFICATE OF CORRECTION

PATENT NO. : 5,729,289

DATED : March 17, 1998

INVENTOR(S): KAZUHIKO ETOH

It is certified that error appears in the above-identified patent and that said Letters Patent is hereby corrected as shown below:

COLUMN 1

Line 20, "has" should read --has been--.
    Line 30, "a" should read --an--.

COLUMN 2

Line 1, "said" should read --the--.
    Line 2, "said" should read --the--.
    Line 14, "other" should read --another--.

COLUMN 3

Line 17, "fire" should read --flash--.

COLUMN 6

Line 59, "said" should read --the--.
    Line 60, "said" should read --the--.

UNITED STATES PATENT AND TRADEMARK OFFICE
CERTIFICATE OF CORRECTION

PATENT NO. : 5,729,289

DATED : March 17, 1998

INVENTOR(S): KAZUHIKO ETOH

It is certified that error appears in the above-identified patent and that said Letters Patent is hereby corrected as shown below:

<u>COLUMN 7</u>

Line 1, "said" should read --the--.
    Line 10, "other" should read --another--.

<u>COLUMN 8</u>

Line 40, "claim 1" should read --claim 3--.
    Line 51, "claim 1" should read --claim 3--.

Signed and Sealed this

Thirtieth Day of March, 1999

Attest:

Q. TODD DICKINSON

*Attesting Officer*     Acting Commissioner of Patents and Trademarks